United States Patent [19]

Ritchie et al.

[11] Patent Number: 4,592,337
[45] Date of Patent: Jun. 3, 1986

[54] THERMO BAG

[76] Inventors: Martin T. Ritchie; George Spector, both of 233 Broadway, RM 3615, New York, N.Y. 10007

[21] Appl. No.: 764,730
[22] Filed: Aug. 12, 1985
[51] Int. Cl.⁴ ............................................. F24J 2/38
[52] U.S. Cl. .................................... 126/424; 126/429; 126/449
[58] Field of Search ............... 126/424, 429, 431, 443, 126/449

[56] References Cited

U.S. PATENT DOCUMENTS

| 4,023,555 | 5/1977 | Bailey | 126/424 |
| 4,076,025 | 2/1978 | Parker | 126/449 X |
| 4,121,565 | 10/1978 | Grisbrook | 126/429 X |
| 4,297,521 | 10/1981 | Johnson | 136/248 |
| 4,442,827 | 4/1984 | Helman et al. | 126/430 |

FOREIGN PATENT DOCUMENTS 1044901  9/1983  U.S.S.R. ............................. 126/424

Primary Examiner—Samuel Scott
Assistant Examiner—Allen J. Flanigan

[57] ABSTRACT

A thermo bag for heating air within a room in a building through a window with solar radiation is provided and consists of a transparent housing that has an open back for attachment within the window and extends downwardly on exterior wall of the building. An air flow divider that has a plurality of heat-storing collector plates is located within the housing allowing cool air from the room to enter, be heated by the collector plates and exit as warm air through the open back into the room. In a modification the air flow divider and the heat-storing collector plates are adjustable to the solar radiation.

1 Claim, 5 Drawing Figures

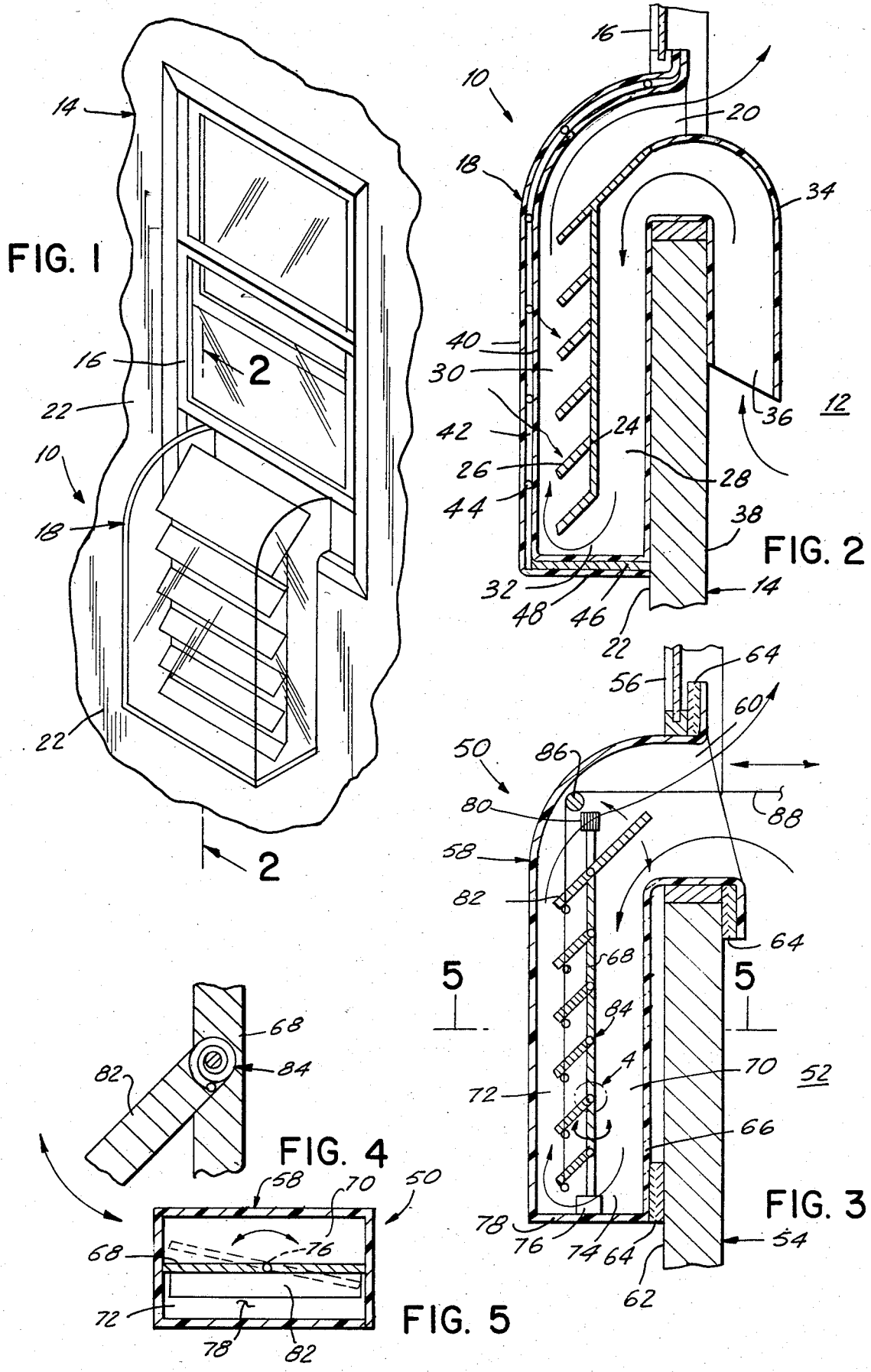

THERMO BAG

BACKGROUND OF THE INVENTION

The instant invention relates generally to solar collectors and more specifically it relates to a thermo bag.

Numerous solar collectors have been provided in prior art that are adapted to utilize solar radiation to heat air. For example, U.S. Pat. Nos. 4,182,307; 4,212,288 and 4,314,548 all are illustrative of such prior art. While these units may be suitable for the particular purpose to which they address, they would not be as suitable for the purposes of the present invention as heretofore described.

SUMMARY OF THE INVENTION

A principle object of the present invention is to provide a thermo bag that can be easily installed within a window to extend downwardly on the exterior wall of a building utilizing solar radiation to heat air within the building.

Another object is to provide a thermo bag that is an easily packageable passive energy product with an extraordinary cost benefit ratio.

An additional object is to provide a thermo bag that is adjustable to the sun's rays to utilize the maximum solar radiation during the daylight hours.

A further object is to provide a thermo bag that is economical in cost to manufacture.

A still further object is to provide a thermo bag that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention mounted within a window and extending downwardly on exterior wall of a building.

FIG. 2 is a vertical cross sectional view taken along line 2—2 in FIG. 1.

FIG. 3 is a vertical cross sectional view similar to FIG. 2 showing a modification whereby the collector plates and flow divider are adjustable to the sun's rays and the thermo bag is secured by VELCRO.

FIG. 4 is an enlarged detail view as indicated by numeral 4 in FIG. 3 showing one of the collector plates being spring biased.

FIG. 5 is a horizontal cross sectional view taken along line 5—5 in FIG. 3.

DETAILED DESCRIPTION OF THE PREFERRED EMBODIMENTS

Turning now descriptively to the drawings, in which similar reference characters denote similar elements throughout the several views, FIGS. 1 and 2 illustrates a thermo bag 10 for heating air within a room 12 in a building 14 through a window 16 with solar radiation.

The bag 10 contains a transparent housing 18 that has an open back 20 for attachment within the window 16 and extends downwardly on exterior wall 22 of the building 14. An air flow divider 24 has a plurality of heat storing collector plates 26 extending forwardly therefrom at angular projections to catch the solar radiation. The divider 24 is located within the housing 18 to vertically divide the housing into a back chamber 28 and a front chamber 30 with a bottom spaced opening 32 therebetween.

A drape or curtain 34 forming an air intake port 36 is mounted to top of the divider 24 and lower portion of the open back 20 of the housing 18. The drape 34 extends downwardly on interior wall 38 of the room 12 allowing cool air from the room to enter the back chamber 28, through the front chamber 30 to be heated by the collector plates 26 and exit as warm air through upper portion of the open back 20 into the room 12.

As best seen in FIG. 2 the housing 18 includes a double vinyl skin 40 that has an air space 42 therebetween to form an insulating seal. The double vinyl skin 40 is held apart by a plurality of horizontal spacers strips 44. A VELCRO adjustment tension strip 46 on bottom 48 of the housing 18 is for easier assembly and tight fit.

A modified thermo bag 50 is shown in FIGS. 3, 4 and 5 for heating air within a room 52 in a building 54 through a window 56 with solar radiation. The bag 50 contains a transparent housing 58 that has an open back 60 for attachment within the window 56 and extends downwardly on exterior wall 62 of the building 54.

VELCRO mating strips 64 are attached around the open back 60 and rear portion 66 of the housing 58. The open back 60 can be secured to the window 56 and the rear portion 66 can be secured to the exterior wall 62.

An air flow divider 68 is located within the housing 58 to vertically divide the housing into a back chamber 70 and a front chamber 72 with a bottom space opening 74 therebetween. The divider 68 is pivotally mounted at 76 to bottom 78 of the housing 58 so that the divider can be vertically adjusted to the solar radiation by turn knob 80.

A plurality of heat-storing collector plates 82 are provided. Each plate 82 is pivotally spring biased at 84 to the divider 68. The plates 82 will normally extend forwardly therefrom at generally angular projections to catch the solar radiation.

A roller 86 is mounted to the housing 58 above the collector plates 82. A cord 88 is attached to and through front of each collector plate 82, around the roller 86 and out of the open back 60 and tied to a fixed structure such as a hook (not shown) within the room 52. When the cord 88 is pulled the angular projection of the collector plates 82 will change for proper adjustment to the sun's rays. Cool air from the room 52 will enter the back chamber 70 through to the front chamber 72 to be heated by the collector plates 82 and exit as warm air through the open back 60 into the room 52.

While certain novel features of this invention have been described and are pointed out in the annexed claims, it will be understood that various omissions, substitutions and changes in the forms and details of the device illustrated and in its operation can be made by those skilled in the art without departing from the spirit of the invention.

What is claimed is:

1. A thermo bag for heating air within a room in a building through a window with solar radiation, the bag comprising:

(a) a transparent housing having an open back adapted to be mounted within said window and extend downwardly on exterior wall of said building;

(b) VELCRO mating strips attached around said open back and a rear portion of said housing so that said open back can be secured to said window and said rear portion can be secured to said exterior wall;

(c) an air flow divider located within said housing to vertically divide said housing into a back chamber and a front chamber with a bottom spaced opening therebetween, said divider pivotally mounted on the bottom of said housing so that said divider can be vertically adjusted to the solar radiation;

(d) a plurality of heat-storing collector plates, each said plate pivotally attached to said divider and spring biased so that said plate will normally extend forwardly therefrom at a generally angular projection to catch said solar radiation;

(e) a roller mounted to said housing above said collector plates; and (f) a cord attached to the front of each said collector plate, around said roller and out of said open back and tied to a fixed structure within said room so that when said cord is pulled said angular projection of said collector plates will change for proper adjustment to the sun's rays, thus cool air from said room will enter said back chamber through to said front chamber to be heated by said collectors plates and exit as warm air through said open back into said room.

* * * * *